United States Patent
Dage

[15] 3,692,906
[45] Sept. 19, 1972

[54] METHOD OF TREATING HYPERTENSION WITH MORPHANTHRIDINES

[72] Inventor: Richard Dage, Brown Deer, Wis. 53223

[73] Assignee: Colgate-Palmolive Company, New York, N.Y.

[22] Filed: June 24, 1970

[21] Appl. No.: 49,502

[52] U.S. Cl. .................................................. 424/244
[51] Int. Cl. ............................................ A61k 27/00
[58] Field of Search ................... 260/239 D; 424/244

[56] References Cited

UNITED STATES PATENTS 3,591,691 7/1971 Gansser et al. ............. 424/244
3,530,219 9/1970 Walker ...................... 424/244

*Primary Examiner*—Sam Rosen
*Attorney*—T. F. Kryshak and M. L. Youngs

[57] ABSTRACT

The inventive method comprises administering a safe and effective amount of a selected morphanthridine to a hypertensive animal to effect a lowering of blood pressure. Representative of the compounds that can be used in the method are 2-chloro-11-(3-dimethylaminopropylidene)-morphanthridine, 11-(3-dimethylaminopropyl)-morphanthridine and 11-(1-methyl-4-piperidylene)-morphanthridine.

6 Claims, No Drawings

METHOD OF TREATING HYPERTENSION WITH MORPHANTHRIDINES

DESCRIPTION OF THE INVENTION

The present invention relates to a method of treating hypertension in animals by administering to the animals a morphanthridine of the formula

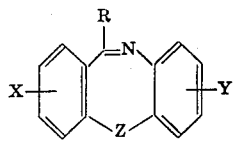

in which Z is

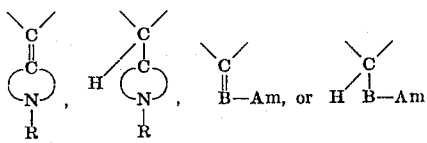

X and Y are members of the group consisting of hydrogen, a halogen such as chloro, bromo and fluoro, lower alkoxy of one to four carbons atoms such as methoxy and ethoxy, lower alkyl of one to four carbon atoms such as methyl and ethyl, alkylsulfamyl such as methyl-sulfamyl and dimethylsulfamyl, thio-lower alkyl such as thiomethyl and thioethyl and trifluoromethyl, R is hydrogen or a lower alkyl of one to four carbon atoms such as methyl, ethyl or propyl, B is an alkylene of one to six carbon atoms, Am is

in which $R_2$ and $R_3$ are selected from hydrogen, a lower alkyl of one to four carbon atoms such as methyl, ethyl or isopropyl, or a phenyl-lower alkyl of seven to 13 carbon atoms such as benzyl, phenethyl or phenylisopropyl, or Am is a heterocyclic amino group such as morpholino, pyrrolidino, piperidino, N-lower alkyl piperazino such as N-methyl piperazino, N-phenyl-lower alkyl piperazino such as N-benzyl piperazino and N-(hydroxy-lower alkyl)-piperazino groups such as 4-($\beta$-hydroxyethyl) piperazino and

is a cyclicamino group such as N-lower alkyl-2,3 or 4-piperidyl, a 2,3 or 4-piperidyl, a N-phenyl-lower alkyl-2,3 or 4-piperidyl, a N-lower alkyl-2 or 3-pyrrolidyl or a N-phenyl-lower alkyl-2 or 3-pyrrolidyl.

In the preferred practice of the invention the hypertensive animal is administered a safe and effective amount of the active ingredient in the form of its free base or in the form of a nontoxic acid addition salt. The active ingredient is preferably combined with one or more pharmaceutical diluents and formed into suitable dosage forms for oral, parental or rectal administration.

The compounds employed in the present invention may be conveniently prepared by oxidation of the corresponding 5,6-dihydromorphanthridines with active manganese dioxide.

The described process may be illustrated as follows:

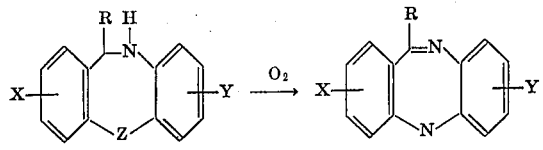

The 5,6-dihydromorphanthridine starting materials may be prepared as described in U.S. Pat. Nos. 3,267,094 and 3,153,652.

Representative of the compounds which may be employed in the practice of the present invention are the following:

11-(1-methyl-4-piperidylene)-morphanthridine,
2-chloro-11-(1-methyl-4-piperidylene)-morphanthridine,
2-trifluoromethyl-11-(1-methyl-4-piperidylene)-morphanthridine,
11-(1-ethyl-4-piperidylene)-morphanthridine,
2-chloro-11-(1-ethyl-4-piperidylene)-morphanthridine, 2-trifluoromethyl-11-(1-ethyl-4-piperidylene)-morphanthridine,
11-(1-benzyl-4-piperidylene)-morphanthridine,
11-(1-methyl-3-piperidylene)-morphanthridine,
11-(1-ethyl-3-piperidylene)-morphanthridine,
11-(1-benzyl-3-piperidylene)-morphanthridine,
11-(1-methyl-3-pyrrolidylene)-morphanthridine,
11-(1-ethyl-3-pyrrolidylene)-morphanthridine,
11-(1-benzyl-3-pyrrolidylene)-morphanthridine,
11-(1-methyl-3-homopiperidylene)-morphanthridine,
11-(1-ethyl-3-homopiperidylene)-morphanthridine,
11-(1-benzyl-3-homopiperidylene)-morphanthridine,
11-(3-dimethylaminopropylidene)-morphanthridine,
2-chloro-11-(3-dimethylaminopropylidene)-morphanthridine,
2-trifluoromethyl-11-(3-dimethylaminopropylidene)-morphanthridine,
11-(3-piperazinopropylidene)-morphanthridine,
2-chloro-11-(3-piperazinopropylidene)-morphanthridine,
2-trifluoromethyl-11-(3-piperazinopropylidene)-morphanthridine,
11-[3-(4-hydroxyethylpiperazinopropylidene)]-morphanthridine,
2-chloro-11-[3-(4-hydroxyethylpiperazinopropylidene)]-morphanthridine,
2-trifluoromethyl-11-[3-(4-hydroxyethylpiperazinopropylidene)]-morphanthridine,
11-(3-diethylaminopropylidene)-morphanthridine,
2-chloro-11-(3-diethylaminopropylidene)-morphanthridine,
2-trifluoromethyl-11-(3-diethylaminopropylidene)-morphanthridine,
11-(3-methylaminopropylidene)-morphanthridine,
2-chloro-11-(3-methylaminopropylidene)-morphanthridine,
2-trifluoromethyl-11-(3-methylaminopropylidene)-morphanthridine,
11-(3-dimethylaminopropyl)-morphanthridine,
2-chloro-11-(3-dimethylaminopropyl)-morphanthridine, 8-chloro-11-(3-dimethylaminopropyl)-morphanthridine,
2-trifluoromethyl-11-(3-dimethylaminopropyl)-morphanthridine,
11-(3-diethylaminopropyl)-morphanthridine,
2-chloro-11-(3-diethylaminopropyl)-morphanthridine,
8-chloro-11-(3-diethylaminopropyl)-morphanthridine,
2-trifluoromethyl-11-(3-diethylaminopropyl)-morphanthridine,
11-(3-methylaminopropyl)-morphanthridine,
2-chloro-11-(3-methylaminopropyl)-morphanthridine,
8-chloro-11-(3-methylaminopropyl)-morphanthridine,
2-trifluoromethyl-11-(3-methylaminopropyl)-morphanthridine,
11-(N-methyl-N-benzylaminopropyl)-morphanthridine,
2-chloro-11-(N-methyl-N-benzylaminopropyl)-morphanthridine,
8-chloro-11-(N-methyl-N-benzylaminopropyl)-morphanthridine,
2-trifluoromethyl-11-(N-methyl-N-benzylaminopropyl)-morphanthridine,
11-(N-methyl-piperazinopropyl)-morphanthridine,
2-chloro-11-(N-methyl-piperazinopropyl)-morphanthridine,
8-chloro-11-(N-methyl-piperazinopropyl)-morphanthridine,
2-trifluoromethyl-11-(N-methyl-piperazinopropyl)-morphanthridine,
11-[3-(4-hydroxyethylpiperazinopropyl)]-morphanthridine,
2-chloro-11-[3-(4-hydroxyethylpiperazinopropyl)]-morphanthridine,
8-chloro-11-[3-(4-hydroxyethylpiperazinopropyl)]-morphanthridine,
2-trifluoromethyl-11-[3-(4-hydroxyethyl-piperazinopropyl)]-morphanthridine,
11-(N-methyl-4-piperidyl)-morphanthridine,
2-chloro-11-(N-methyl-4-piperidyl)-morphanthridine,
8-chloro-11-(N-methyl-4-piperidyl)-morphanthridine,
2-trifluoromethyl-11-(N-methyl-4-piperidyl)-morphanthridine,
11-(N-benzyl-4-piperidyl)-morphanthridine,
2-chloro-11-(N-benzyl-4-piperidyl)-morphanthridine,
8-chloro-11-(N-benzyl-4-piperidyl)-morphanthridine,
2-trifluoromethyl-11-(N-benzyl-4-piperidyl)-morphanthridine,
11-(N-methyl-3-piperidyl)-morphanthridine,
2-chloro-11-(N-methyl-3-piperidyl)-morphanthridine,
8-chloro-11-(N-methyl-3-piperidyl)-morphanthridine,
2-trifluoromethyl-11-(N-methyl-3-piperidyl)-morphanthridine,
11-(N-ethyl-3-pyrrolidyl)-morphanthridine,
11-(N-benzyl-3-pyrrolidyl)-morphanthridine,
11-(N-methyl-3-homopiperidyl)-morphanthridine,
2-trifluoromethyl-11-[3-(4-hydroxyethyl-piperazinopropylidene)]-morphanthridine,
11-(3-diethylaminopropylidene)-morphanthridine,
2-chloro-11-(3-diethylaminopropylidene)-morphanthridine,
2-trifluoromethyl-11-(3-diethylaminopropylidene)-morphanthridine,
11-(3-methylaminopropylidene)-morpthanthridine,
2-chloro-11-(3-methylaminopropylidene)-morphanthridine, and
2-trifluoromethyl-11-(3-methylaminopropylidene)-morphanthridine.

The compounds 2-chloro-11-(3-dimethylaminopropylidene)-morphanthridine, 11-(1-methyl-4-piperidylene)-morphanthridine, 11-(3-dimethylaminopropylidene)-morphanthridine, and 11-(3-dimethylaminopropyl)-morphanthridine are representative of the compounds which can be employed in the practice of the inventive method. The aforementioned compounds, when administered intravenously in doses of 0.05 to 1.0 mg/kg of body weight to vagotomized or nonvagotomized cats, which had been anesthetized with sodium pentobarbitol and/or chloralose, produced pronounced and sustained decreases in blood pressure.

The compounds when evaluated in sodium pentobarbitol anesthetized dogs produced similar results. The test procedure employed included blood pressure measurement from the right femoral artery using a volume-displacement pressure transducer and polygraph. The compound was administered intravenously into the right femoral vein and blood flow was measured by a single channel flowmeter and monitored on a polygraph. The test animals were both vagotomized and nonvagotomized dogs. In the tests the compounds produced dose related decreases in blood pressure.

The pharmaceutical compositions which may be employed are oral dosage forms such as tablets, coated or uncoated, of the immediate or the sustained release type capsules, syrups, elixirs, sterile parenteral solutions, suppositories, or the like.

Representative of suitable pharmaceutical compositions which may be employed in the practice of the invention are the following:

TABLETS

|     |                                                  | Mg. |
|-----|--------------------------------------------------|-----|
| (1) | 2-Chloro-11-(3-dimethylamino propylidene) morphanthridine | 10 |
| (2) | Starch U.S.P.                                    | 57  |
| (3) | Lactose U.S.P.                                   | 73  |
| (4) | Talc U.S.P.                                      | 9   |
| (5) | Stearic acid                                     | 6   |

Powders (1), (2) and (3) are slugged, then granulated, mixed with (4) and (5) and tableted.

Capsules may be prepared by filling No. 3 hard gelatin capsules with the following ingredients:

CAPSULES

|     |                                                   | Mg. |
|-----|---------------------------------------------------|-----|
| (1) | 2-Chloro-11-(3-dimethylamino-propylidene) morphanthridine | 10 |
| (2) | Lactose U.S.P.                                    | 200 |
| (3) | Starch U.S.P.                                     | 16  |
| (4) | Talc U.S.P.                                       | 8   |

The oral route is generally preferred for administering the compounds of this invention. However, other routes of administration such as parenteral may be employed.

In the preferred practice of the invention the patients will receive daily doses of from 5 mg. to 500 mg. of the active ingredient. The doses to be administered to a specific patient will, of course, depend upon many factors, including the patient's overall condition, the severity of the hypertension and the level at which the blood pressure is desired to be stabilized. Generally speaking, however, the daily doses will not normally exceed 3 mg/kg of body weight intraperitoneally. The oral dose will run somewhat higher and the intravenous doses somewhat lower.

The following examples illustrate the preparation of representative compounds which may be employed in the practice of the invention:

Example 1

11-(3-Dimethylaminopropylidene)morphanthridine

To a cooled slurry of 16.4 g. (0.032 mole) of 3-dimethylaminopropyltriphenylphosphonium bromide hydrobromide in 50 ml. of tetrahydrofuran is added with stirring 0.064 mole of butyl lithium solution. The mixture is stirred 1 hour at room temperature, cooled, and 4.97 (0.029 mole) of 11-morphanthridone in 25 ml. of tetrahydrofuran added dropwise. The solution is stirred for 1.5 hours at room temperature, refluxed for 10 hours, cooled, 20 ml. of water added and the mixture concentrated. The residue is treated with dilute aqueous hydrochloric acid and benzene, and the aqueous layer separated and made alkaline with potassium hydroxide. The resulting oil is extracted into ether, dried over potassium carbonate, filtered, concentrated, and distilled to yield 11-(3-dimethyl-aminopropylidene)morphanthridine, b.p. 188°–200° (0.05 mm.) This base is then converted to the bis-cyclohexylsulfamate, m.p. 116°–117°.

Anal. Calcd. for $C_{31}H_{46}N_4O_6S_2$: C, 58.64; H, 7.30; N, 8.82.

Found: C, 58.90; H, 7.55; N, 8.82.

Example 2

11-(3-Dimethylaminopropylidene)morphanthridine

Active manganese dioxide (15 g.) is stirred and refluxed with 150 ml. of benzene using a water separator. After 4.5 hours, 3.58 g. (0.013 mole) of 11-(3-dimethylaminopropylidene)-5,6-dihydromorphanthridine in a small amount of benzene is added and the suspension stirred and refluxed for 18 hours. The $MnO_2$ is filtered off, rinsed with benzene, the filtrate concentrated, and the residue chromatographed over 150 g. of silica gel and eluted with benzene-diethylamine (40:1) to yield an oil, 11-(3-dimethylaminopropylidene)morphanthridine, which is identical to the product of Example 1.

Example 3

11-(1-Methyl-4-piperidylene)morphanthridine

A suspension of 20 g. of active manganese dioxide in 200 ml. of benzene is stirred and refluxed for 2 hours using a water separator. When no more water separates a solution of 4.95 g. of 5,6-dihydro-11-(1-methyl-4-piperidylene)morphanthridine in 50 ml. of benzene is added and the suspension stirred and refluxed for 16 hours. The inorganic material is filtered off, rinsed with benzene, the filtrate concentrated, and the residue chromatographed over $SiO_2$ gel using a mixture of benzene-methanol (19:1) as eluent. The appropriate fractions were combined and distilled using a Kugelrohr apparatus to yield 11-(1-methyl-4-piperidylene)morphanthridine. IR absorption shows a C=N band at 6.20 micron.

Anal. Calcd. for $C_{20}H_{20}N_2$: C, 83.29; H, 6.99; N, 9.71

Found: C, 83.55; H, 7.05; N, 9.73.

Example 4

2-Chloro-11-(3-dimethylaminopropylidene)morphanthridine

To a stirred refluxing mixture of 400 ml. of benzene and 36 g. of active manganese dioxide is added 8.95 g. of 2-chloro- 11-(3-dimethylaminopropylidene)-5,6-dihydromorphanthridine and the mixture is stirred and refluxed for 6 hours using a water separator. The $MnO_2$ is filtered off, the filtrate concentrated, distilled at high vacuum using a Kugelrohr apparatus, chromatographed over 300 g. of $SiO_2$ gel and eluted with benzene-methanol (9:1), and the appropriate fractions combined and recrystallized from 35 ml. of petroleum ether (b.p. 60-70°) to yield 2-chloro-11-(3-dimethylaminopropylidene)morphanthridine, m.p. 92-93°.

Anal. Calcd. for $C_{19}H_{19}ClN_2$: C, 73.41; H, 6.16; N, 9.02; Cl, 11.41.

Found: C, 73.99; H, 6.24; N, 8.92; Cl, 11.49.

Example 5

11-(3-Dimethylaminopropyl)morphanthridine

Active manganese dioxide (25 grams) is refluxed with 250 ml. of benzene using a water separator. After 2 hours, 5.3 grams (0.019 mole) of 11-(3-dimethylaminopropyl)-5,6-dihydromorphanthridine in 100 ml. of benzene is added and the suspension stirred and refluxed for 18 hours. The $MnO_2$ is filtered off, rinsed with benzene, and the filtrate concentrated to yield the crude base. Chromatography over silica gel using benzene-methanol (19:1) as eluent followed by benzene-diethylamine (40:1) affords 11-(3-dimethylaminopropyl)morphanthridine.

Anal. Calcd. for $C_{19}H_{22}N_2$: C, 81.97; H, 7.97; N, 10.06.

Found: C, 82.24; H, 8.31; N, 10.22.

I claim:

1. A method of treating hypertension in animals which comprises administering to a hypertensive animal a safe and effective amount of a compound of the formula

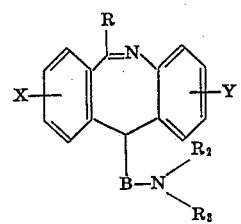

in which X and Y are hydrogen, halogen, lower alkoxy of one to four carbon atoms, lower alkyl of one to four carbon atoms, thiolower alkyl, alkyl sulfamyl and trifluoromethyl, R is hydrogen or lower alkyl of one to four carbon atoms, B is an alkylene of one to six carbon atoms, and $R_2$ and $R_3$ are hydrogen, alkyl of one to four carbon atoms or phenyl lower alkyl of seven to 13 carbon atoms.

2. The method of claim 1 in which R is hydrogen.

3. The method of claim 1 in which R, X and Y are hydrogen.

4. The method of claim 1 in which R, X and Y are hydrogen, B is propylene, and $R_2$ and $R_3$ are hydrogen or lower alkyl.

5. The method of claim 1 in which R, X and Y are hydrogen, B is propylene, and $R_2$ and $R_3$ are methyl.

6. The method of claim 1 in which R and X are hydrogen, Y is 2-chloro, B is propylene, and $R_2$ and $R_3$ are methyl.

* * * * *